United States Patent
Godfrey

[15] 3,697,877
[45] Oct. 10, 1972

[54] METHODS AND APPARATUS FOR GENERATING ELECTRICAL WAVEFORMS AND QUADRATUREPHASE TRAPEZOIDAL AND/OR SINUSOIDAL WAVEFORMS

[72] Inventor: James P. Godfrey, Nashua, N.H.

[73] Assignee: Sanders Associates, Inc., Nashua, N.H.

[22] Filed: Feb. 8, 1971

[21] Appl. No.: 113,481

[52] U.S. Cl. ............... 328/13, 235/186, 235/197, 307/228, 307/229, 307/261, 307/268, 328/27, 328/35, 328/36, 328/156, 328/158, 328/181
[51] Int. Cl. ................... H03b 19/00, H03k 5/08
[58] Field of Search......307/228, 229, 246, 261, 268; 328/27, 35, 13, 36, 14, 156–158, 180–181, 59–61; 235/186, 197, 198

[56] References Cited

UNITED STATES PATENTS

| 3,217,173 | 11/1965 | Strohmeier | 307/261 X |
| 3,278,765 | 10/1966 | Mudie | 307/229 X |
| 3,500,212 | 3/1970 | Berg | 328/14 X |
| 3,125,694 | 3/1964 | Palthe | 307/288 |

OTHER PUBLICATIONS

" Digitization of Rise and Fall Time" by Georgallis in IBM Tech. Disclosure Bulletin, Vol. 5, No. 4, September 1962, page 33

Primary Examiner—Stanley D. Miller, Jr.
Attorney—Louis Etlinger

[57] ABSTRACT

Conic generator apparatus controlled by a digital program source for tracing conic or eliptical patterns on a cathode ray tube CRT screen. The conic generator responds to a stop signal from the program source to simultaneously produce during a conic trace interval one cycle of a sine and a cosine wave. This is done by first producing a pair of quadrature phased trapezoidal waveforms. Next, the quadrature phased trapezoidal waveforms are converted to a pair of quadrature phased triangular waveforms which are then shaped to produce the sine and cosine waves. The quadrature phased trapezoidal waveforms are produced by controlling the linear charge and discharge of a pair of capacitors between high and low clamping limits.

14 Claims, 7 Drawing Figures

INVENTOR
JAMES P. GODFREY
BY Robert R. Hubbard
ATTORNEY

FIG. IA

INVENTOR
JAMES P. GODFREY
BY Robert R. Hubbard
ATTORNEY

| Sm | Rn | Qn+1 | Q̄n+1 |
|---|---|---|---|
| H→L | H | H | L |
| H→L | L | H | H |
| H | H→L | L | H |
| L | H→L | H | H |
| L | L→H | H | L |
| L→H | L | L | H |

FIG. 5

INVENTOR
JAMES P. GODFREY
BY *Robert R. Hubbard*
ATTORNEY

METHODS AND APPARATUS FOR GENERATING ELECTRICAL WAVEFORMS AND QUADRATUREPHASE TRAPEZOIDAL AND/OR SINUSOIDAL WAVEFORMS

The invention herein described was made in the course of or under a contract or sub-contract thereunder with the Department of the Navy.

BACKGROUND OF THE INVENTION

1. Field of the Invention

This invention relates to novel and improved waveform generating methods and apparatus therefor. In particular, the invention relates to the simultaneous generation of a pair of quadrature phased waveforms, i.e., a pair of waveforms having relative phase displacement of 90° ($\pi/4$ radians) and further relates to the formation of triangular waveforms.

2. Prior Art

Quadrature phased waveforms are employed in many applications as, for example, conic formation in graphics and/or fine arts applications, spectrum analysis and other applications. Prior art methods or devices, though suitable in some system designs, are generally unsatisfactory for use in systems, such as conic generators, where rapid start and stop times as well as only single cycle operation are required. One known quadrature phased waveform generator intended for use in conic generators employs Miller integrater type devices which are subject to drift, even during a single cycle, and thus cause an error in the relative phase displacement.

BRIEF SUMMARY OF THE INVENTION

An object of the present invention is to provide novel and improved waveform generating methods and apparatus for implementing such method.

Another object is to provide a novel method of forming a triangular waveform.

Still another object is to provide a novel method of forming quadrature phased waveforms.

Yet another object is to provide novel and improved apparatus which generates trapezoidal waveforms in quadrature phase.

A further object is to provide novel and improved apparatus for generating a pair of sinusoidal waveforms in quadrature phase.

In accordance with one embodiment of the invention, a triangular waveform is produced by first generating a pair of quadrature phased trapezoidal waveforms and either summing the trapezoidal waveform pair to produce a triangular waveform or in the alternative taking the difference between a trapezoidal waveform pair to produce a triangular waveform. In another embodiment of the invention, both the sum and the difference of the trapezoidal waveform pair is taken so as to produce a pair of triangular waveforms in quadrature phase with one another. In still another embodiment of the invention, the quadrature phased triangular waveforms are shaped to produce sine and cosine waveforms.

Also according to the invention, first and second quadrature phased trapezoidal waveforms are produced across first and second capacitors in the following manner. A first capacitor is charged from a first to a second voltage level while the second capacitor is clamped to the first voltage level. The second capacitor is then charged from the first to the second voltage level while the first capacitor is clamped to the second voltage level. Next the first capacitor is discharged from the second level to the first level while the second capacitor is clamped to the second level. Finally, the second capacitor is discharged from the second level to the first level while the first capacitor is clamped to the first level.

BRIEF DESCRIPTION OF THE DRAWING

In the accompanying drawings, like reference characters denote like elements of structure, and.

DESCRIPTION OF PREFERRED EMBODIMENT

It is contemplated that the waveform generating method and apparatus of the present invention can be used in any application where it is desired to generate a triangular waveform or a pair of trapezoidal, triangular or sinusoidal waveforms in quadrature phase. However, by way of example and completeness of description, the method and apparatus of the invention are herein illustrated in a conic generator application.

Although the fundamentals of conic generation are well known, the following brief resume is presented as a convenience to the reader. In accordance with basic analytical geometry, the parametric equations of a circle on an X–Y coordinate plane are:

$$x = R \cos(wt), \text{ and}$$

$$y = R \sin(wt)$$

where $R$ is the radius of the circle and the parameter $w$ is the rate of angular rotation of a point which draws the circle.

With the above equations, the starting point P is on the positive X-axis and the rotation is counter-clockwise. The parametric equations of a circle which is located so that the starting point P is no longer on the X-axis but on a radius at angle $\alpha$ to that axis are:

$$y = R \cos(wt + \alpha), \text{ and}$$

$$y = R \sin(wt + \alpha)$$

By basic trigonometry these equations can be converted to:

$$X = R \cos(wt) \cos \alpha - R \sin(wt) \sin \alpha \text{ and}$$

$$Y = R \cos(wt) \sin \alpha + R \sin(wt) \cos \alpha$$

These parametric equations define a circle which is one form of an ellipse, i.e., the eccentricity $e$ of the ellipse is equal to zero. The eccentricity $e$ is related to the length of the semi-major axis $R$ of the ellipse and to the length of the semi-minor axis $r$ by the equation:

$$e = \sqrt{\frac{R^2 - r^2}{R}}$$

To introduce eccentricity into the equations, a semi-minor axis $r$ is substituted for the semi-major axis $R$ in the second term of each equation and the equations become:

$$x = R \cos(wt) \cos\alpha - r \sin(wt) \sin\alpha$$

and $$y = R \cos(wt) \sin\alpha + r \sin(wt) \cos\alpha$$

By feeding waveforms indicative of the above equations to the deflection controls of a display device, such as a cathode ray tube, an ellipse will be displayed. According to one exemplary conic generator design, a digital program source provides in digital signal form the ellipse parameters $R \sin\alpha$, $R \cos\alpha$, $r \sin\alpha$ and $r \cos\alpha$ which are combined in suitable arithmetic networks with a pair of quadrature phased sinusoidal waveforms to form the $X$ and $Y$ deflection signals for ellipse generation.

Figure 1:
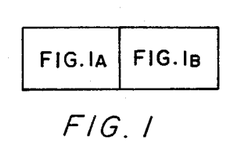
FIG. 1 shows the composite arrangement of FIGS. 1A and 1B which illustrate conic generator apparatus embodying the present invention.
Figure 1A:
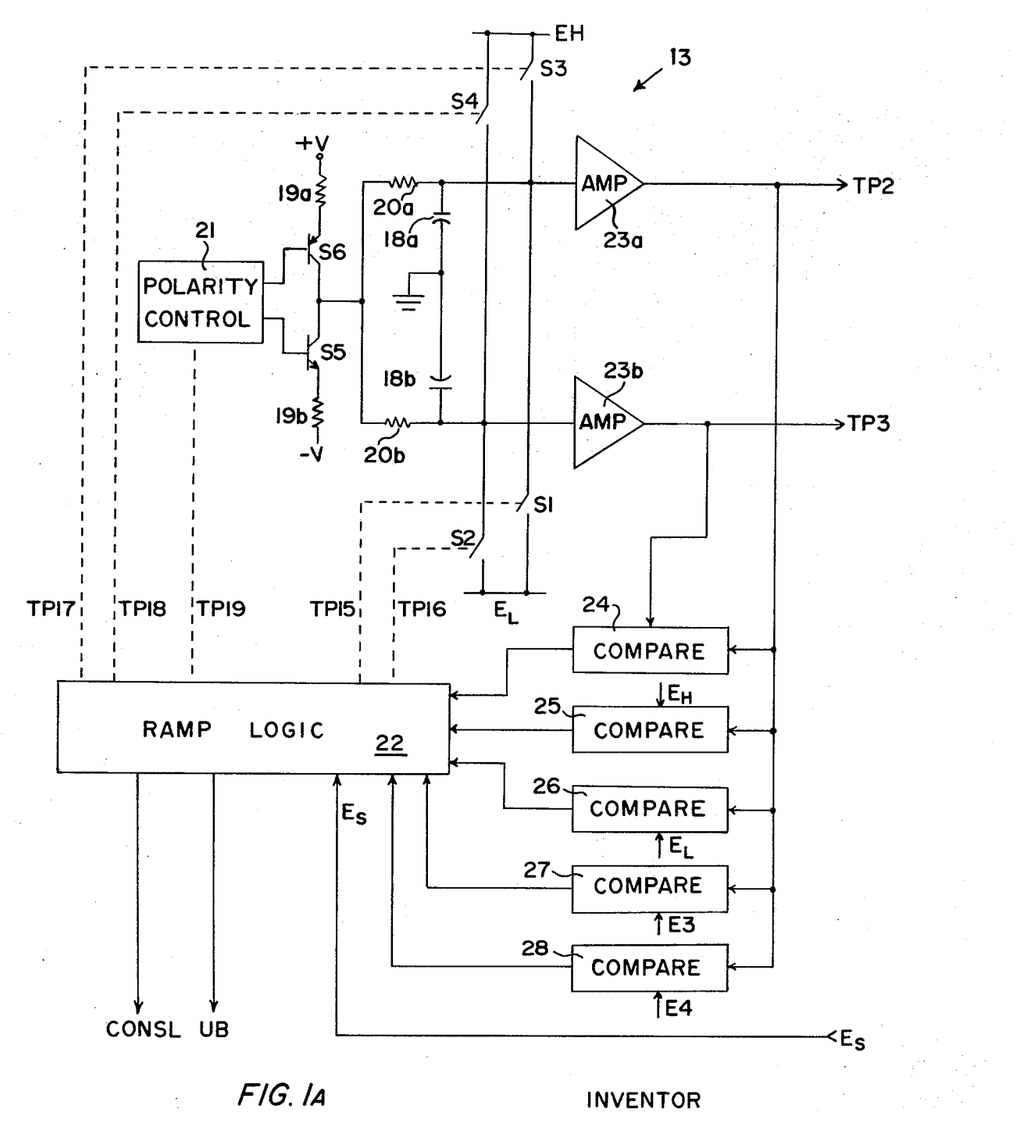
Figure 1B:
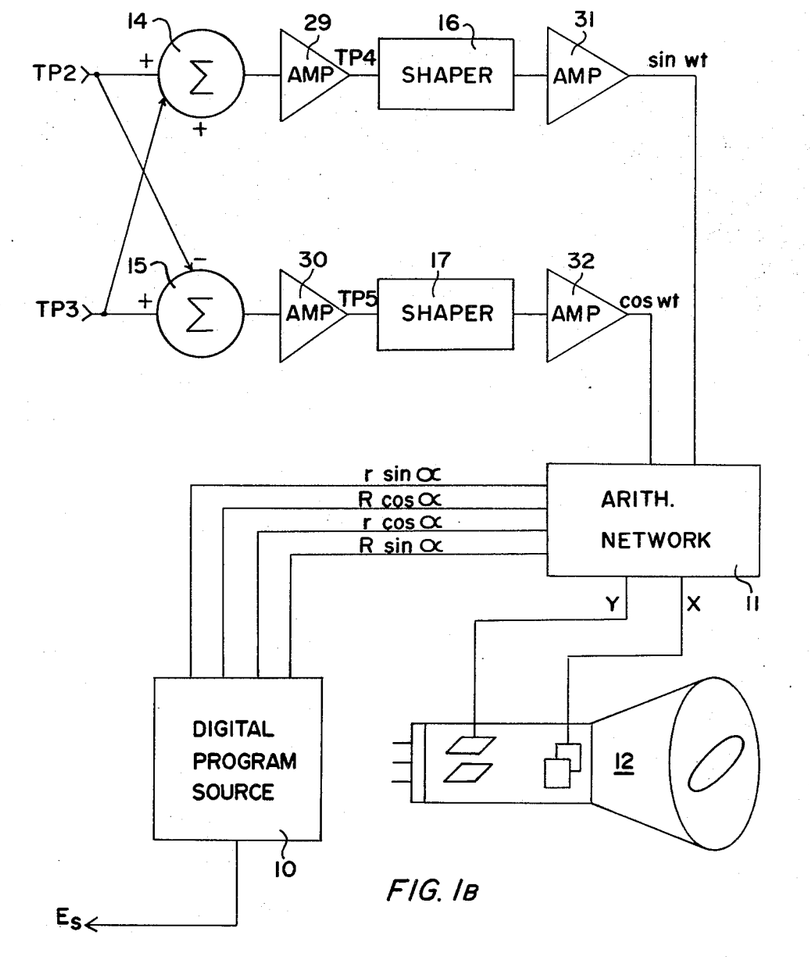

With reference now to FIGS. 1A and 1B arranged as shown by the FIG. 1 composite, a digital program source 10 is shown to provide the ellipse parameters $r \sin\alpha$, $R \cos\alpha$, $r \cos\alpha$ and $R \sin\alpha$ to an arithmetic network 11 via data buses. Although each of the data buses is shown as a single line, it is understood that each contains a number of leads equal to the number of bits in the digital numbers which represent the ellipse parameters. The arithmetic network 11 includes multiplying networks for multiplying the digitally represented ellipse parameters by a pair of quadrature phased signals identified as sin wt cos wt in FIG. 1B and further includes algebraic addition circuits to produce at its output X- and Y-deflection signals which represent the equations set forth above. The X- and Y-deflection signals are applied to the horizontal and vertical deflection controls of the cathode ray tube (CRT)12. The CRT 12 is shown as an example of a display device which may be employed for the display of an ellipse. It will be appreciated that other display devices may be employed, as for example, X-Y plotting machines.

The details of the arithmetic network 11 and the digital program source 10 are unnecessary to an understanding of the present invention and therefore will not be described in detail herein. Suffice it to say here that similar devices are described in the prior art, as for example, in U.S. Pat. No. 3,476,974.

Still referring to FIGS. 1A and 1B there is shown apparatus embodying the waveform generator of the present invention. To produce a pair of sinusoidal waveforms in quadrature phase, a pair of quadrature phased trapezoidal waveforms are first provided at circuit points TP2 and TP3 by a generator 13 in response to a start signal $E_s$ provided by the digital program source 10. These quadrature phased trapezoidal waveforms are designated in the waveform diagram of FIG. 2 by the circuit location points TP2 and TP3. The sum and difference of the quadrature phased trapezoidal waveforms are then produced by the algebraic addition networks 14 and 15 respectively, to provide at circuit points TP4 and TP5 a pair of quadrature phased triangular waveforms. The quadrature phased triangular waveforms are then shaped by means of shaper networks 16 and 17 to produce the quadrature phased sinusoidal waveforms. The quadrature phased sinusoidal waveforms are then applied to the arithmetic network 11.

The trapezoidal waveform generator 13 includes a pair of ramp generating capacitors 18a and 18b which are charged and discharged along linear portions of their operating curves between the clamping limits of a high voltage $E_H$ and a low voltage $E_L$. The charge and discharge circuit paths for the capacitors 18a and 18b are provided by a bi-polar switching network which includes a PNP transistor S6, an NPN transistor S5 and a pair of resistors 19a and 19b.

The transistor S6 has its collector - emitter path connected in series with resistor 19a and a point of positive potential designated as $+V$ and with both capacitors 18a and 18b by way of isolating resistors 20a and 20b, respectively. This circuit path provides current flow in the conventional sense out of the collector of transistor S6 and will be referred to herein as the charging circuit for the capacitors 18a and 18b. On the other hand, transistor S5 has its collector emitter path connected in series with a resistor 19b and a point of negative potential designated as $-V$ and with both capacitors 18a and 18b by way of the resistors 20a and 20b, respectively. This circuit path will be referred to herein as the discharge circuit for the capacitors 18a and 18b since current flow in the conventional sense is into the collector transistor S5.

Figure 2:
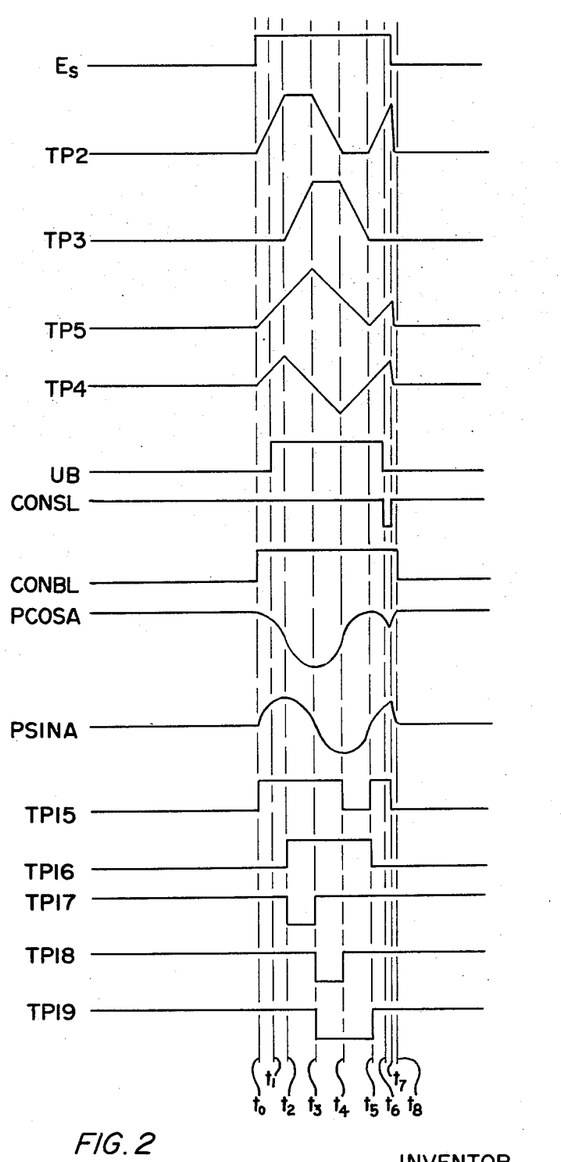
FIG. 2 is a waveform diagram showing waveforms which occur at various points in the FIG. 1A and 1B apparatus.

A polarity control network 21 responds to a polarity control signal TP19 provided by ramp logic 22 to turn one of the transistors S5 and S6 off and the other on. As shown in FIG. 2, the signal TP19 is a bi-level signal. When the signal TP19 is at its higher level, transistor S6 is turned on and S5 is turned off. On the other hand, when the signal TP19 is at its lower level, transistor S6 is turned off and transistor S5 is turned on. Polarity control networks which function in the foregoing manner are known in the art and any suitable network may be employed.

The maximum and minimum voltages across the capacitors 18a and 18b are determined by a clamping network which includes switches S1 through S4 and a pair of clamping voltages $E_H$ and $E_L$. The high clamping voltage $E_H$ is connected across the capacitors 18a and 18b by means of switches S3 and S4, respectively. The lower clamping voltage $E_L$ is connectable across the capacitors 18a and 18b by means of the switches S1 and S2, respectively. Although the switches S1 through S4 are illustrated in FIG. 1 with simple, conceptual mechanical switch symbols, it is understood that each such switch may be any suitable electronic switching device as, for example, a transistor. The clamping voltages $E_H$ and $E_L$, as well as the aforementioned voltages $\pm V$, may be derived from any suitable power supply (not shown) which is referenced to a point of suitable reference potential, such as circuit ground.

The ramp signal outputs are taken from circuit points TP2 and TP3 which are isolated from the capacitors 18a and 18b by isolating devices 23a and 23b, respectively. The isolating devices 23a and 23b may suitably be operational amplifiers which have any suitable gain as determined by the design of the system. For the purpose of the present description, however, it is assumed that the devices 23a and 23b have unity gain.

The voltage levels at circuit points TP2 and TP3 are sensed by comparators 24 through 28. The comparator 24 compares the signals TP2 and TP3 with one another. The comparators 25 and 26 compare the voltage levels of the signals TP2 with maximum and minimum voltages, respectively, which for the illustrated embodiment, are shown as $E_H$ and $E_L$. The comparators 27 and 28 compare the TP2 voltage levels with reference voltages E3 and E4. The outputs of comparators 24 through 26 are responded to by the ramp logic 22 to produce the polarity control signal TP19 as well as clamp control signals TP15 through TP17 which control the on/off conditions of the clamping switches S1 through S4, respectively. The ramp logic 22 will be described in detail later on.

The operation of the trapezoidal waveform generator 13 will now be described with reference to the waveform timing diagram shown in FIG. 2. Prior to time $t_0$, the initial state of the generator is as follows. The clamping switches S1 and S2 are closed (waveforms TP15 and TP16 are low) and clamping switches S3 and S4 are open (waveforms TP17 and TP18 are high). For this initial condition, the lower clamping voltage $E_L$ is connected across both of the capacitors 18a and 18b such that both of the generator output waveforms TP2 and TP3 are at the lower level $E_L$. This condition of the waveforms TP2 and TP3 is responded to by the comparators 24 and 26 and the ramp logic 22 to maintain the generator 13 in its initial state. In addition, the high level of the polarity control waveform TP19 assures that transistor S6 is turned on and transistor S5 is turned off.

At time $t_0$ the digital program source 10 provides a start signal $E_S$ to the ramp logic 22. The ramp logic 22 responds to the start signal at $t_0$ to switch the waveform TP15 from the low to the high level and thereby open switch S1 and allow capacitor 18a to charge toward a more positive voltage via the charging circuit provided by the turned on transistor S6. Consequently, the waveform TP2 begins to rise in a linear manner at time $t_0$ and continues to rise linearly until time $t_2$.

At time $t_1$ comparator 27 responds to a change in the polarity of the difference between the TP2 waveform and a fixed voltage E3 and signals the ramp logic 22. The ramp logic responds thereto to provide a high level signal UB. The signal UB may be employed as the unblank signal for the CRT 12.

At time $t_2$ the comparator 25 senses that the waveform TP2 has obtained its maximum value of $E_H$ and signals the ramp logic 22. The ramp logic 22 then switches the waveforms TP16 and Tp17 high and low, respectively, thereby opening switch S2 and closing switch S3. The closing switch S3 connects the higher level clamping voltage $E_H$ across the capacitor 18a so that the waveform TP2 is clamped to the $E_H$ level. On the other hand, the opening of switch S2 removes the lower level clamping voltage $E_L$ from the capacitor 18b and allows the capacitor 18b to begin charging toward a more positive voltage by way of the transistor S6 charging circuit. Consequently, the waveform TP3 at this time of $t_2$ begins to rise linearly and continues to rise linearly until time $t_3$.

At time $t_3$ comparator 24 senses that the TP3 waveform has achieved the maximum value (i.e., it is identical in value to the TP2 waveform at this time) and signals the ramp logic 22. The ramp logic 22 responds thereto to switch the polarity control waveform TP19 from high to low. This causes transistor S6 to turn off and transistor S5 to turn on. Also at time $t_3$ the ramp logic 22 switches the TP17 and TP18 waveforms from high and low, respectively. Switch S4 closes and clamps the clamping voltage $E_H$ across the capacitor 18b such that the waveform TP3 is now clamped to the $E_H$ value. The switch S3 opens and the capacitor 18a begins to charge toward a negative voltage by way of the transistor S5 discharge circuit. This action of the circuit continues until time $t_4$.

At time $t_4$ comparator 26 senses that the waveform TP2 has attained its minimum value of $E_L$ and signals the ramp logic 22. The ramp logic 22 responds thereto to switch the TP15 waveform low and the TP18 waveform high. This causes switch S1 to close and connect the clamping voltage $E_L$ across capacitor 18a. The TP18 waveform causes switch S4 to open and thereby allow capacitor 18b to charge toward a negative voltage by way of a transistor S5 discharge circuit. The capacitor 18b continues to discharge in a linear manner until time $t_5$.

At time $t_5$ the comparator 24 senses the identity of the TP2 and TP3 waveforms and signals the ramp logic 22. The ramp logic 22 switches the polarity control waveform TP19 high so as to turn transistor S5 off and transistor S6 on. Also at this time the ramp logic 22 switches the TP15 waveform high and the TP16 waveform low. This causes switch S2 to close and thereby connect the clamping voltage $E_L$ across the capacitor 18b. The switch S1 is opened by the TP15 waveform. Thus, at this instant, all of the conditions which existed immediately following $t_0$ have been restored such that all of the waveforms begin repeating in accordance with the explanation of the operation following $t_0$.

At time $t_6$ the comparator 28 senses the change in the polarity of the difference between TP2 waveform and a fixed voltage E4 and signals the ramp logic 22. The ramp logic 22 responds thereto to switch the unblank signal UB from the high level to the low level. This high/low transition of the UB signal is employed by the ramp logic to reset all of the waveforms to their quiescent levels where they remain until another conic waveform sequence is initiated by a recurrence of the $E_S$ signal.

The TP2 and TP3 waveforms are seen to be symmetrically trapezoidal, periodic (although truncated after along slightly more than a single cycle) and phased displaced relative to one another by one-fourth cycle (90° or $\pi/4$ radians). The sum and difference of the TP2 and TP3 waveforms are formed by the algebraic summation networks 14 and 15 in combination with their associated operational amplifier units 29 and 30. The sum and difference waveforms appear at points TP4 and TP5 and are symmetrically triangular, periodic and in quadrature phase with one another. The triangular waveforms TP4 and TP5 are then shaped by the shaper networks 16 and 17 to produce the sinusoidal waveforms sin $wt$ and cos $wt$ after amplification by the associated amplifiers 31 and 32.

Figure 3:
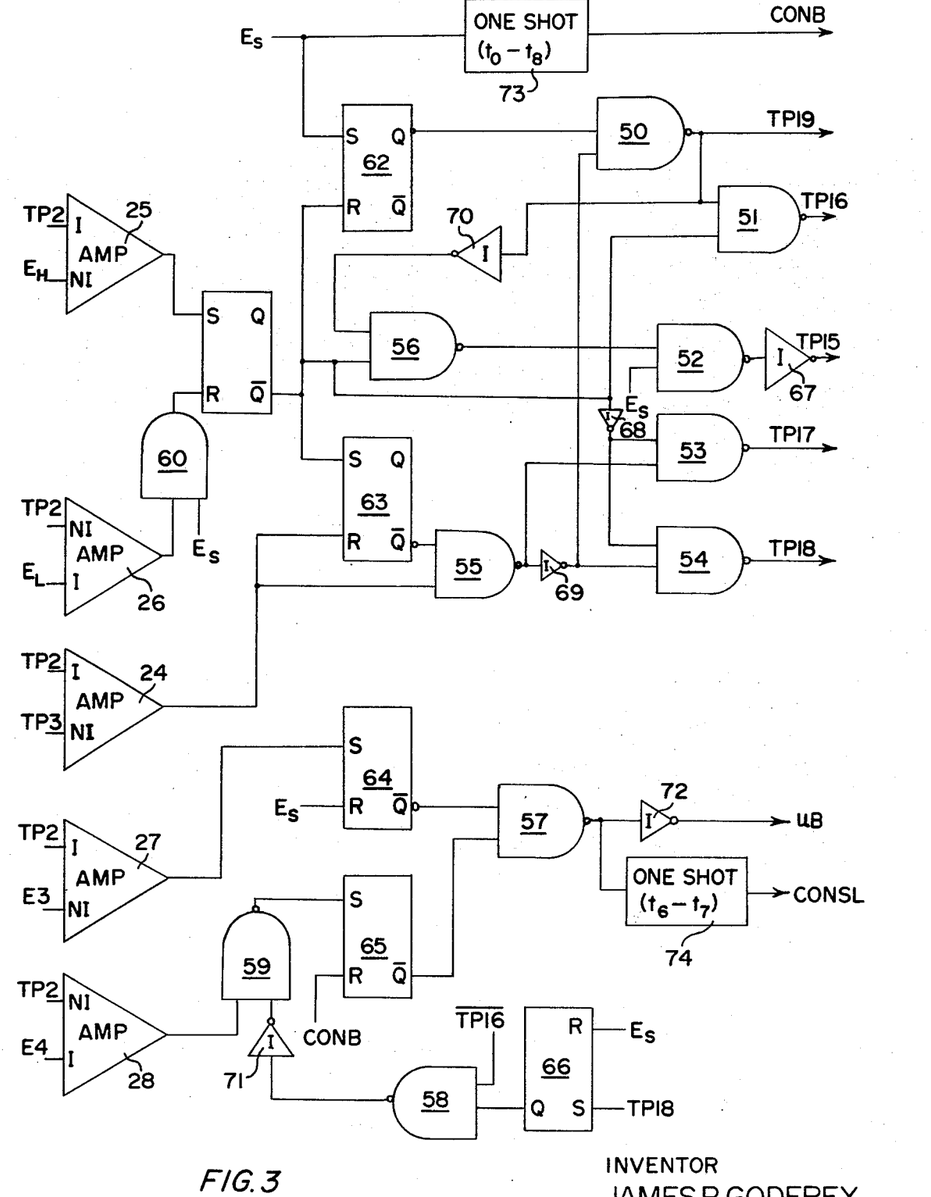
FIG. 3 is a schematic logic diagram of one example of the ramp logic which may be employed in the FIG. 1 conic generator.

Although the ramp logic may take on different forms in different embodiments, an exemplary embodiment is shown in FIG. 3. In FIG. 3, the comparators 24 through 28 have been reproduced for ease of description. Each of the comparators may suitably be of the model 710 type, currently available from Fairchild Camera and Instrument Corporation. Such comparators have both an inverting (I) and a non-inverting (NI) input and at least one output. The comparator output is high (H) whenever its NI input is greater than its I input and is low (L) whenever its NI input is equal to or less than its I input. As shown in FIG. 3, the TP2 signal is applied to the I inputs of comparators 24, 25 and 27 and to the NI inputs of comparators 26 and 28. The high $E_H$ and low $E_L$ clamping voltages are applied to the NI and I inputs of comparators 25 and 26, respectively. The E3 and E4 reference voltages are applied to the NI and I inputs of the comparators 27 and 28. Finally, the TP3 waveform is applied to the NI input of comparator 24.

Apparatus embodying the ramp logic 25 may employ any suitable logical elements, J-K flip flops, D-type flip flops, data latches and other types. By way of example, the illustrated embodiment is shown to employ coincidence type gates 50 through 59 which for positive logic convention ($H=1, L=0$) are NAND gates and for negative logic convention ($H=0, L=1$) are NOR gates. The positive logic convention is assumed for purposes of the present description such that the gates 50 through 59 will be hereinafter referred to as NAND gates. The ramp logic also employs a further coincidence type gate 60 which for the positive logic convention is an AND gate. The ramp logic also employs inverters 67 through 72, each of which may suitably be a NAND gate having all its inputs connected in common.

Figure 4:
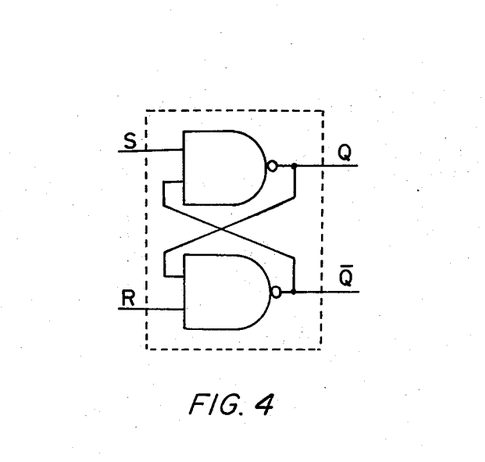
FIG. 4 is a schematic logic diagram illustrative of the data latches employed in the FIG. 3 logic diagram.
Figure 5:
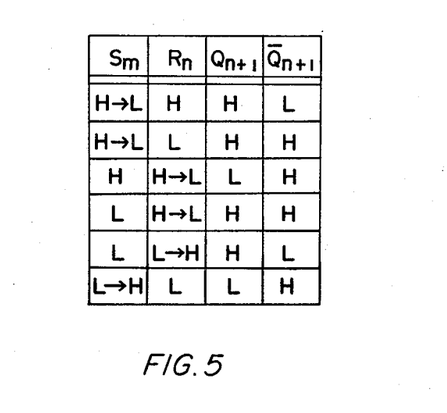
FIG. 5 is a truth table for the FIG. 4 data latch.

The flip flops 61 through 66 are assumed to be of the data latch type in which a pair of two input NAND gates are cross coupled to one another in the manner shown in FIG. 4. The truth table for this type of flip flop is shown in FIG. 5 where the subscript $n$ refers to the transition time of the S and R signals and the subscript $n+1$ refers to the state of the Q and $\overline{Q}$ outputs of the latch just subsequent to the switching time $n$. As can be seen from the FIG. 5 truth table, when both S and R inputs are at the H level and one changes to the L level, the flip flop changes state just like a conventional R-S flip flop. However, if one of the inputs is at the L level, say the R input, and S input changes from H to L, only the gate associated with the S input changes its condition. A subsequent L to H transition of the R input is needed to latch or lock the state of the flip flop.

The ramp logic 25 also employs one shot (monostable multivibrators) 73 and 73. The one shots 73 and 74 may take on any suitable circuit form which provides the respective timing functions as discussed below.

The output signal conditions in terms of H and L for high and low signal values, respectively, of all the circuits referenced in FIG. 3 are shown in TABLE I for those instances which either precede or succeed the times $t_0$ through $t_8$ of a conic trace interval in accordance with the designators + or −. Thus, the signal values in the $t_0$31 column are those which prevail just after the $t_0$. On the other hand, the signal values in the $t_0+$ column are those which prevail just after the $t_0$ time. In the TABLE only changes in signal value have been recorded in the columns $t_0+$ through $t_8+$. A blank space in a particular column for a particular circuit signifies that there is no change in signal condition for that circuit at that particular time. Thus, the output of the flipflop FF61 is at the H level prior to $t_0$ and remains at the H level until $t_2$. At $t_2$ the output of FF61 goes to the L level and remains at the L level until time $t_4$ when it is switched back to the H level. The FF61 output then remains at the H level for the remainder of the conic trace interval.

TABLE

Output states of FIG. 3 circuits for Conic Draw Interval

| Components | $t_0-$ | $t_0+$ $t_1$ | $t_2+$ $t_3+$ | $t_4+$ $t_5+$ $t_6+$ | $t_7+$ $t_8+$ |
|---|---|---|---|---|---|
| Comp. 26 | L | H | | L H | L |
| " 25 | H | | L H | | |
| " 24 | L | | H | L | |
| " 27 | H | L | H* | L* | H |
| " 28 | L | H | L* | H | L |
| Gate 60 | L | H | | H | |
| FF 61 ($\overline{Q}$) | H | | L | H | |
| FF 62 (Q) | L | | H | | |
| FF 63 ($\overline{Q}$) | L | | H | L | |
| FF 64 ($\overline{Q}$) | L | H | | | L |
| FF 65 ($\overline{Q}$) | H | | | L | H |
| FF 66 (Q) | L | | H | | L |
| Gate 50(TP19) | H | | L | H | |
| Gate 51(TP16) | L | | H | L | |
| Gate 52 | H | | | H L | H |
| Gate 53(TP17) | H | | L H | | |
| Gate 54(TP18) | H | | L | H | |
| Gate 55 | H | | L | H | |
| Gate 56 | H | | L | | |
| Gate 57 | H | L | | H | |
| Gate 58 | H | | | L | H |
| Gate 59 | H | | | L H | |
| inverter 67(TP15) | L | H | | L H | L |
| Inverter 68 | L | | H | L | |
| Inverter 69 | L | | H | L | |
| Inverter 70 | L | | H | L | |
| Inverter 71 | L | | | H | L |
| Inverter 72(UB) | L | H | | L | |
| Oneshot 73(ConB) | L | H | | | L |
| Oneshot 74(CONSL) | H | | | L H | |
| Start Signal $E_s$ | L | H | | L | |

Just prior to $t_0$, the signal conditions designated in the $t_0-$ column of the TABLE prevail. In FIG. 3 and TABLE I, the waveforms TP19, TP16, TP15, TP17 and TP18 are shown to be produced by NAND gates 50 and 51, NAND gate 52 by way of inverter 67 and NAND gates 53 and 54, respectively.

At time $t_0$, the start signal $E_S$ supplied by the digital program source 10 (FIG. 1B) has an L to H transition to signify the start of a conic trace interval. The one shot 73 responds to the rising edge of the $E_S$ signal to provide a conic busy signal (CONB) having a duration for the entire conic trace interval from $t_0$ to $t_8$. The CONB waveform is also shown on the waveform diagram of FIG. 2. Also at time $t_0$, the $E_S$ signal causes NAND gate 52 to switch from the H to the L level which is inverted by inverter 67 to produce the L-H transition for the TP15 waveform.

The TP2 waveform begins to rise linearly as capacitor 18a (FIG. 1A) begins to charge due to the opening of the $E_L$ clamping switch S1 by the TP15 waveform. However, the tracing of the conic is delayed at this time in order to allow for slewing of the CRT beam. Thus, the unblank signal UB is retained at the L level (blank) until time $t_1$. At the time $t_1$, the TP2 waveform becomes equal to or greater than the reference voltage E3 and the output of comparator 27 has an H to L transition causing flip flop 64 to switch. Gate 57 responds to the L to H transition at the output of FF64 to provide an L level at its output which is inverted by inverter 72 to provide the L to H transition of the unblank signal UB at the time $t_1$. The CRT beam then becomes unblanked and the conic tracing begins.

The TP2 waveform continues to rise until time $t_2$ when it becomes equal to the higher level clamping voltage $E_H$. This condition is sensed by comparator 25 which produces an H to L transition causing FF61 to switch which in turn causes FF62 to switch. The switching of FF61 is sensed by NAND gate 51 which produces at its output the L to H transition of the TP16 waveform. This causes the clamping switch S2 to open so as to remove the lower level clamping voltage $E_L$ from the capacitor 18B.

The switching of FF61 at time $t_2$ is also sensed by NAND gate 53 via inverter 68 to produce at its output the H to L transition of the TP17 waveform. This causes the switch S3 (FIG. 1A) to close and thereby clamp the capacitor 18A to the higher level $E_H$ voltage.

The TP3 waveform rises linearly from $t_2$ to $t_3$ (due to the charging of capacitor 18B in FIG. 1A) until it becomes equal to the $E_H$ value to which the TP2 waveform is clamped. The equality of the TP2 and TP3 waveforms at time $t_3$ is sensed by the comparator 24 which produces an L to H transition causing FF63 to latch. It should be noted that FF63 had its S input conditioned at time $t_2$ when FF61 switched (see column $t_2+$ of the TABLE). The output of FF63 switches to the H level. NAND gate 55 also changes its state thereby causing NAND gates 53 and 54 to change their respective states so as to produce the L to H and H to L transitions of the TP17 and TP18 waveforms, respectively. This causes switches S3 and S4 (FIG. 1A) to open and close, respectively. Capacitor 18B is now clamped to $E_H$ level. The $E_H$ clamping voltage is removed from the capacitor 18A so as to permit its discharge.

From $t_3$ to $t_4$, the waveform TP2 linearly charges toward the $E_L$ clamping voltage. At time $t_4$ the comparator 26 senses the equality of the TP2 waveform with the $E_L$ voltage to produce at its output an H to L transition. This transition is responded to by AND gate 60 to switch FF61. The switching of FF61 is sensed by NAND gate 54 to produce the L to H transition of waveform TP18. This causes clamping switch S4 in FIG. 1A to open so as to permit the discharge of capacitor 18B.

The switching of FF61 at time $t_4$ is also sensed by NAND gates 56 and 52 so as to produce the H to L transition at the output of inverter 67 of waveform TP15. This transition causes the switch S1 in FIG. 1A to close so as to clamp the capacitor 18A to the $E_L$ voltage.

From $t_4$ to $t_5$, the TP3 waveform falls linearly towards the $E_L$ value. At time $t_5$, the TP3 waveform becomes equal to the $E_L$ value to which the TP2 waveform is clamped. The comparator 24 senses the equality of the TP2 and TP3 waveforms to produce at its output an H to L transition which causes FF63 to switch. The switching of FF63 is sensed via gate 55 by gates 50, 51 and 52 to produce the L to H transition of waveform TP19, the H to L transition of TP16 and the L to H transition of TP15 (at the output of inverter 67), respectively. The transitions of waveforms TP15, and TP16 cause switches S1 and S2 to open and close, respectively, thereby clamping capacitor 18B to the $E_L$ voltage and permitting capacitor 18A to charge toward the $E_H$ voltage. The TP19 transition, of course, causes the charging transistor S5 and discharging transistor S6 to be turned off and on, respectively.

From $t_5$ to $t_6$, the TP2 waveform rises linearly toward the $E_H$ clamping voltage. At time $t_6$, the TP2 waveform becomes equal to reference voltage E4. This equality condition is sensed by comparator 28 so as to cause NAND gate 59 and FF65 to change their conditions which in turn causes NAND gate 57 and inverter 72 to switch thereby driving the unblank UB signal low. This causes the CRT beam to turn off. So that the entire conic may be traced the E4 voltage is slightly greater than the E3 voltage which determines the turn-on time of the CRT beam.

The NAND gate 59 is inhibited from responding to changes in the output of comparator 28 prior to $t_5$ by means of a network which includes FF66, NAND gate 58 and inverter 71. The output of FF66 is at the L level until time $t_3$ such that NAND gate 59 is inhibited by an L level at the output of inverter 71 from $t_0$ to $t_3$. The waveform TP16 dips to the L value from time $t_2$ through time $t_5$ so as to continue to hold the output of inverter 71 at the L level. At time $t_3$ the FF66 is switched so as to provide at its Q output an H level. Consequently, at time $t_5$ when the TP16 waveform changes to the H level, NAND gate 58 switches and the output of inverter 71 goes to the H level. The NAND gate 59 will then be enabled from time $t_5$ through time $t_7$ at which time FF66 is reset by the falling edge of the start signal $E_S$.

The L to H and H to L transitions of the comparators 27 and 28, respectively have been starred in the $t_3+$ column of the TABLE in order to indicate that these transitions take place at those times during the $t_3$ to $t_4$ interval when the TP2 signal becomes equal to the reference voltages E3 and E4, respectively. It is also for this reason, that the H to L transition of the comparator 27 is starred in the $t_5+$ column of the TABLE.

The L to H transition at the output of gate 57 at time $t_6$ triggers the one shot 74 to produce a control signal CONSL at its output. The CONSL signal is responded to by the digital program source 10 (FIG. 1B) to produce the falling edge of the stop signal $E_S$ at time $t_7$.

At time $t_7$ the falling edge of the stop signal $E_S$ is sensed by NAND gate 52 which causes the TP15 waveform (at the output of inverter 67) to dip to the L value. The falling edge of the $E_S$ signal also serves to reset the flip flops FF64 and FF66. At time $t_8$, the conic busy signal CONB falls from the H to the L level signifying that the conic trace interval has ended. The CONB signal is also employed to reset FF65. All of the circuit components in FIG. 3 have been returned to their initial signal conditions which existed just prior to $t_0$ ($t_0-$) and the conic generator 13 is ready for its next command or $E_S$ start signal from the program source 10.

What is claimed is:

1. The method of simultaneously producing a pair of quadrature phased triangular waveforms, comprising the steps of
generating a pair of quadrature phased trapezoidal waveforms;
summing said trapezoidal waveform pair to produce a first triangular waveform; and subtracting one of said trapezoidal waveforms from the other to produce a second triangular waveform in quadrature phase with said first triangular waveform.

2. The method of simultaneously producing a pair of sine and cosine waveforms comprising the steps of generating a pair of quadrature phased trapezoidal waveforms;

summing said trapezoidal waveform pair to produce a first triangular waveform;

subtracting one of said trapezoidal waveforms from the other to produce a second triangular waveform in quadrature phase with said first triangular waveform; and shaping said first and second triangular waveforms to produce sine and cosine waveforms.

3. The method of simultaneously producing first and second quadrature phase trapezoidal waveforms across first and second capacitors, respectively, comprising the steps of charging the first capacitor from a first to a second voltage level while clamping the second capacitor to the first voltage level;

charging the second capacitor from the first to the second voltage level while clamping the first capacitor to the second voltage level;

discharging the first capacitor from the second level to the first level while clamping the second capacitor to the second level; and discharging the second capacitor from the second level to the first level while clamping the first capacitor to the first level.

4. Waveform generating apparatus comprising first and second capacitors;

means for charging the first and second capacitors in successive first and second time intervals, respectively, from a first to a second voltage level;

means for discharging the first and second capacitors in successive third and fourth time intervals from the second to the first voltage level, where the third time interval follows the second time interval;

means for clamping the first capacitor to the second and first voltage levels during the second and fourth time intervals; and means for clamping the second capacitor to the first and second voltage levels during the first and third time intervals, respectively.

5. Waveform generating apparatus as set forth in claim 4 and further including a first circuit responsive to the equality of the voltage across the first capacitor with the second voltage level to initiate the start of the second time interval;

a second circuit responsive to the equality of the voltages across both capacitors to initiate the start of the third interval; and a third circuit responsive to the equality of the voltage across the first capacitor with the first voltage level to initiate the start of the fourth interval.

6. Waveform generating apparatus as set forth in claim 5 wherein said second circuit includes means for enabling said charging circuit and inhibiting said discharging circuit during the first and second time intervals and for inhibiting said charging circuit and enabling said discharging circuit during the third and fourth time intervals, respectively.

7. Waveform generating apparatus as set forth in claim 6 and further including means for summing the voltages across said first and second capacitors to produce a first triangular waveform; and means for taking the difference between the voltages developed across the first and second capacitors to produce a second triangular waveform in quadrature phase with the first triangular waveform.

8. Waveform generating apparatus as set forth in claim 7 and further including a shaper circuit for shaping said first and second triangular waveforms to produce sine and cosine waveforms.

9. Waveform generating apparatus comprising means for generating a pair of quadrature phased trapezoidal waveforms;

means for summing said trapezoidal waveform pair to produce a first triangular waveform; and means for taking the difference between said trapezoidal waveforms to produce a second triangular waveform in quadrature phase with said first triangular waveform.

10. Waveform generating apparatus as set forth in claim 9 and further including means for shaping said first and second triangular waveforms to produce sine and cosine waveforms.

11. Waveform generating apparatus comprising means for generating a pair of quadrature phased trapezoidal waveforms; and means for summing said trapezoidal waveform pair to produce a triangular waveform.

12. Waveform generating apparatus comprising means for generating a pair of quadrature phased trapezoidal waveforms; and means for taking the difference between said trapezoidal waveforms to produce a triangular waveform.

13. The method of producing a triangular waveform, comprising the steps of generating a pair of quadrature phased trapezoidal waveforms; and summing said trapezoidal waveform pair to produce said triangular waveform.

14. The method of producing a triangular waveform, comprising the steps of generating a pair of quadrature phased trapezoidal waveforms; and taking the difference between said trapezoidal waveforms to produce said triangular waveform.

* * * * *